United States Patent [19]

Watanabe et al.

[11] Patent Number: 5,333,242

[45] Date of Patent: Jul. 26, 1994

[54] METHOD OF SETTING A SECOND ROBOTS COORDINATE SYSTEM BASED ON A FIRST ROBOTS COORDINATE SYSTEM

[75] Inventors: Atsushi Watanabe; Fumikazu Terawaki; Fumikazu Warashina, all of Minamitsuru, Japan

[73] Assignee: Fanuc Ltd, Yamanashi, Japan

[21] Appl. No.: 910,171

[22] PCT Filed: Nov. 15, 1991

[86] PCT No.: PCT/JP91/01566

§ 371 Date: Jul. 14, 1992

§ 102(e) Date: Jul. 14, 1992

[87] PCT Pub. No.: WO92/09019

PCT Pub. Date: May 29, 1992

[30] Foreign Application Priority Data

Nov. 16, 1990 [JP] Japan .................. 2-310711

[51] Int. Cl.$^5$ ............................. G06F 15/00
[52] U.S. Cl. ........................ 395/89; 395/83; 395/86
[58] Field of Search .................. 395/83, 86, 89

[56] References Cited

U.S. PATENT DOCUMENTS

| 5,021,970 | 6/1991 | Mohri et al. | 395/83 |
| 5,041,991 | 8/1991 | Fujiki | 395/83 |
| 5,084,826 | 1/1992 | Hariki et al. | 395/83 |

FOREIGN PATENT DOCUMENTS

| 62-108314 | 5/1987 | Japan . | |
| 63-34606 | 2/1988 | Japan | G05B 19/403 |
| 63-184806 | 7/1988 | Japan | G05B 19/403 |
| 2-262986 | 10/1990 | Japan | G05B 19/403 |
| 2-272604 | 11/1990 | Japan . | |

Primary Examiner—Allen R. MacDonald
Attorney, Agent, or Firm—Staas & Halsey

[57] ABSTRACT

A robot coordinate system setting method is provided which facilitates the setting of a common coordinate system with respect to each of robots in a robot system or a robot installed in substitution for one of the robots. A coordinate transformation matrix for transforming a provisional coordinate system (X2Y2Z2), which a first robot has recognized by accessing a second jig, into a common coordinate system (X1Y1Z1), which the first robot has recognized by accessing a first jig, is calculated, and using this coordinate transformation matrix, a provisional coordinate system which a second robot has recognized by accessing the second jig is transformed into the common coordinate system which is to be recognized by the second robot, and is set with respect to the second robot. If a robot is installed in substitution for the second robot, method similar to the above is used to obtain a second provisional coordinate system, which the substitute robot has recognized by accessing the third jig, and is transformed into the common coordinate system which is to be recognized by the substitute robot, whereby the common coordinate system is set with respect to the substitute robot.

2 Claims, 2 Drawing Sheets

METHOD OF SETTING A SECOND ROBOTS COORDINATE SYSTEM BASED ON A FIRST ROBOTS COORDINATE SYSTEM

BACKGROUND OF THE INVENTION

1. Field of the Invention

This invention relates to a method of setting a robot coordinate system, and more particularly, to a robot coordinate system setting method which facilitates the setting of a common coordinate system shared by a plurality of robots included in a robot system and the setting of a common coordinate system with respect to a robot installed in substitution for a robot in the robot system.

2. Description of the Related Art

When globally controlling a plurality of robots included in a robot system in a factory line or the like, a robot control program described using a common coordinate system shared by all robots is usually employed. To control the operation of the individual robots, coordinate transformation matrices which relate the common coordinate system to coordinate systems uniquely set for the respective robots are used to transform commands expressed with reference to the common coordinate system into those expressed with reference to the coordinate systems related to the individual robots. To this end, coordinate transformation matrices related to the respective robots are predetermined; in other words, the common coordinate system is set with respect to each of the robots.

When setting a common coordinate system with respect to each of robots installed such that they share a common domain of motion, conventionally a jig is placed in the common domain of motion, and a known position of the jig with reference to the common coordinate system is directly taught to the individual robots so that each robot may recognize a position and orientation thereof with respect to the common coordinate system, whereby a common coordinate system is set with respect to each of the robots. Thus, to set the common coordinate system by this method, the robots must be positioned such that they share a common domain of motion. This requirement imposes heavy restrictions on the arrangement of robots and hinders suitable configuration of robot systems.

In the case of robot systems including a robot which does not share a domain of motion with the other robots thus the aforesaid method cannot be applied because it requires a jig to be positioned in the common domain of motion shared by all robots. Conventionally the setting of a common coordinate system with respect to the robots is carried out by using a special jig which all robots can access. This method is, however, disadvantageous in that a special jig must be prepared.

After the common coordinate system is once set by either of the aforementioned methods, if a robot becomes out of order and a substitute robot is installed therefor, the common coordinate system must be set with respect to this substitute robot, with a normal jig or special jig located at exactly the same position as that used before to set the common coordinate system. It is, however, difficult to place the normal or special jig at exactly the same position, and therefore, the common coordinate system must be again set with respect to each of the robots. Accordingly, restoration work of the robot system consumes labor and time.

SUMMARY OF THE INVENTION

A first object of this invention is to provide a robot coordinate system setting method which permits an easy setting of a common coordinate system with respect to a plurality of robots included in a robot system.

A second object of this invention is to provide a robot coordinate system setting method which permits an easy setting of a common coordinate system with respect to a robot which has been installed in substitution for a robot previously set in a robot system.

To achieve the first object, this invention provides a method of setting a robot coordinate system, comprising the steps of: (a) placing a first jig at a first position directly accessible by a first robot; (b) placing a second jig at a second position directly accessible by both the first robot and a second robot which cannot directly access the first jig; (c) calculating, by computing means, a coordinate transformation matrix for transforming a provisional coordinate system which the first robot has recognized by accessing the second jig into a common coordinate system which the first robot has recognized by accessing the first jig; (d) transforming a provisional coordinate system which the second robot has recognized by accessing the second jig into the common coordinate system which is to be recognized by the second robot, by the computing means and using the coordinate transformation matrix; and (e) setting the common coordinate system which is to be recognized by the second robot, with respect to the second robot by setting means.

To achieve the second object, the method according to this invention further comprises the steps of: (f) arranging a third robot in substitution for the second robot; (g) placing a third jig at a third position accessible by both the first and third robots; (h) calculating, by the computing means, a second coordinate transformation matrix for transforming a second provisional coordinate system which the first robot has recognized by accessing the third jig located at the third position into the common coordinate system which the first robot has recognized in the step (c); (i) transforming the second provisional coordinate system which the third robot has recognized by accessing the third jig located at the third position into the common coordinate system which is to be recognized by the third robot, by the computing means and using the second coordinate transformation matrix; and (e) setting the common coordinate system which is to be recognized by the third robot, with respect to the third robot by the setting means.

As described above, according to this invention, a coordinate transformation matrix for transforming the provisional coordinate system, which the first robot has recognized by accessing the second jig located at the second position directly accessible by both the first and second robots, into the common coordinate system, which the first robot has recognized by accessing the first jig located at the first position inaccessible by the second robot, is calculated, and using this coordinate transformation matrix, the provisional coordinate system which the second robot has recognized by accessing the second jig is transformed into the common coordinate system which is to be recognized by the second robot, whereby the common coordinate system is set with respect to the second robot.

Accordingly, even when the first and second robots are arranged in such a manner that the domains of motion thereof do not overlap with each other, the common coordinate system can be set with respect to the first and second robots by using two jigs, instead of using a special jig which is accessible by both robots. Consequently, the setting of the common coordinate system imposes no restrictions on the arrangement of robots, and two or more robots in a robot system can be arranged in a manner best suited to the configuration of the robot system, whereby the robot system can be optimally constructed.

If, for example, the second robot, which is one of the robots included in the robot system, develops trouble, and thus a third robot is installed in substitution therefor, a second coordinate transformation matrix for transforming the second provisional coordinate system, which the first robot has recognized by accessing the third jig located at the third position accessible by both the first and third robots, into the common coordinate system already recognized by the first robot is calculated, and the second provisional coordinate system which the third robot has recognized by accessing the third jig is transformed into the common coordinate system which is to be recognized by the third robot, by using the second coordinate transformation matrix, whereby the common coordinate system is set with respect to the third robot.

Accordingly, the common coordinate system can be set with respect to the substitute robot, with the third jig, which may be the same as or different from the second jig, placed at the third position which may or may not coincide with the second position at which the second jig was placed during the previous setting of the common coordinate system. Consequently, it is not necessary to set the common coordinate system again for each of the robots when a substitute robot is installed in place of one of the robots in the robot system, whereby the robot system, and accordingly, a factory line including the system can be readily restored.

DETAILED DESCRIPTION OF THE PREFERRED EMBODIMENTS

Figure 1:
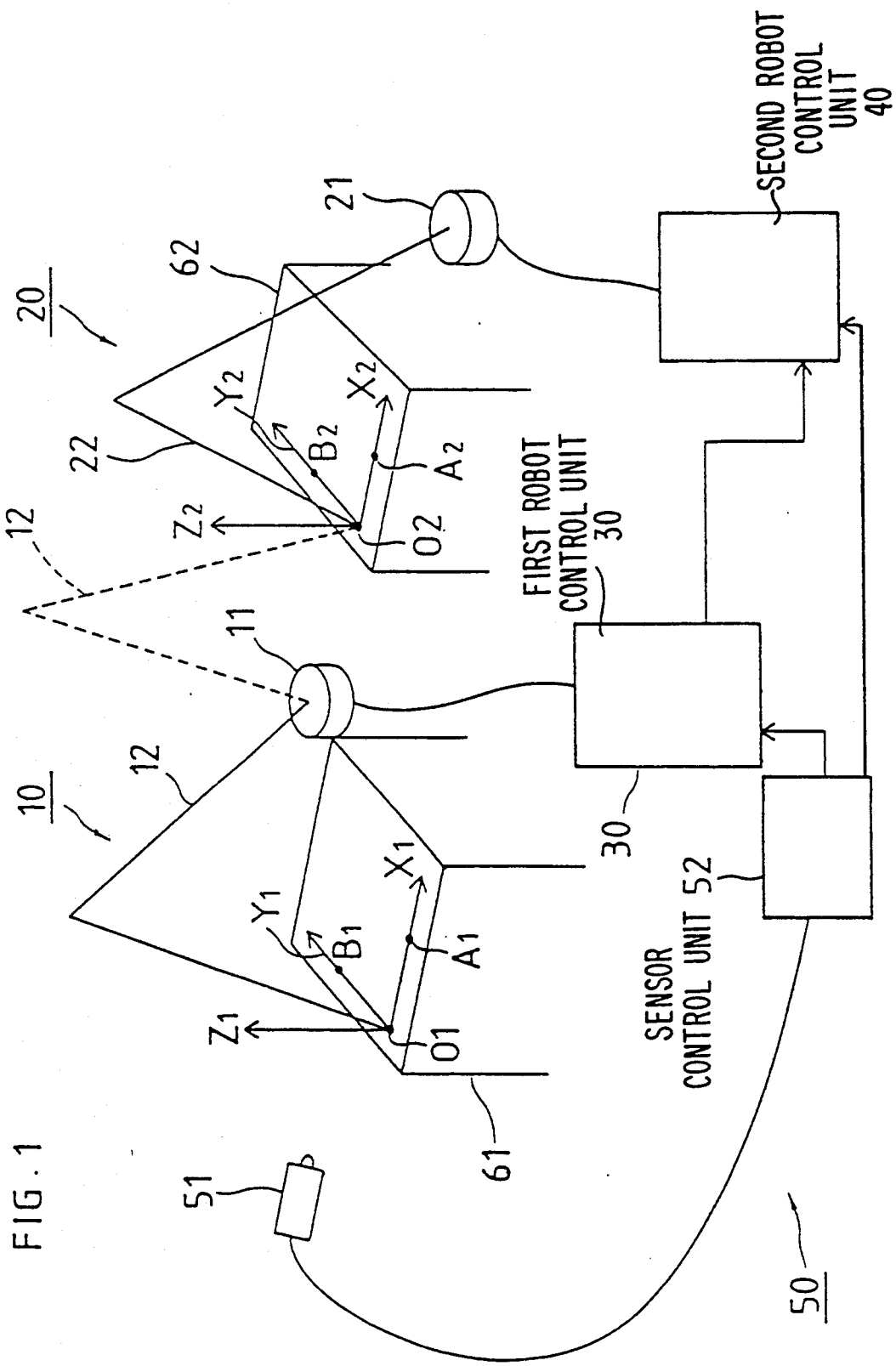
FIG. 1 is a schematic diagram illustrating the principle of setting a common coordinate system in a robot system, based on which a robot coordinate system setting method according to one embodiment of this invention is carried out.

Referring to FIG. 1, a robot system to which a robot coordinate system setting method according to one embodiment of this invention is applied is installed, e.g., in a factory line, and comprises a first robot body 10 and a second robot body 20 which are arranged at a distance from each other.

Although not illustrated in detail, the first robot body 10 comprises, e.g., a multijoint robot including a swivel support 11, which is placed on a base secured to the floor and is coupled thereto through a first joint, and an arm 12 having first and second links. The first link is coupled to the swivel support 11 through a second joint, and the second link is coupled to the first link through a third joint. The first robot body 10 further includes servomotors associated with axes through which the swivel support 11 and the first and second links are respectively actuated, pulse coders associated with the respective servomotors for detecting a joint angle, and current value registers to which outputs of the respective pulse coders are supplied and which retain data representing current joint angles. The second robot body 20 comprises a similar multijoint robot. In FIG. 1, reference numerals 21 and 22 denote those parts of the second robot body 20 which correspond respectively to the swivel support 11 and the arm 12 of the first robot body 10.

Further, the robot system comprises first and second robot control units 30 and 40 for controlling the operation of the first and second robot bodies 10 and 20, respectively, and a vision system 50. The robot control units 30 and 40 each function as computing means and setting means for setting a common coordinate system, described in detail later.

The first robot control unit 30 constitutes a first robot is used as a reference robot, in cooperation with the first robot body 10, and the second robot control unit 40 constitutes a second robot with respect to which a coordinate system is to be set, in cooperation with the second robot body 20. The vision system 50 of the robot system includes a camera 51 serving as a visual sensor for recognizing, e.g., an object of work on the factory line, and a visual sensor control unit 52 for obtaining image data by subjecting an image signal from the camera 51 to image processing and supplying the obtained image data to the first and second robot control units 30 and 40.

The first robot control unit 30 stores a first control program for controlling the first robot body, which is described using a common coordinate system X1Y1Z1 shared by the first and second robot bodies 10 and 20, and controls the operation of the servomotors associated with the individual axes of the first robot body 10 in accordance with commands which are obtained through transformation of commands in the first control program by using a coordinate transformation matrix which will be mentioned later, and thus are expressed with reference to a first robot coordinate system (not shown) peculiar to the first robot body 10. Similarly, the second robot control unit 40 controls the operation of the second robot body 20 in accordance with commands corresponding to those in a second control program and expressed with reference to a second robot coordinate system (not shown). A control panel (not shown) is provided at each of the robot control units 30 and 40 to permit a manual robot operation.

The following is a description of a procedure for setting a common coordinate system shared by the first and second robots in the robot system having the above-described configuration.

The operator places a first jig 61 for the common coordinate system at a first position which is inside the domain of motion of the arm 12 of the first robot body 10 but outside the domain of motion of the arm 22 of the second robot body 20. Namely, the first jig 61 is placed at a position accessible only by the first robot. Subsequently, the operator places a second jig 62 for a provisional coordinate system at a position which is inside the domains of motion of the robot arms 12 and 22 and thus accessible by both robots.

The operator then manually operates the first robot body 10 through the control panel of the first robot control unit 30, to position the distal end of the first robot arm 12 at a first mark on the first jig 61 corresponding to the origin O1 of the common coordinate system X1Y1Z1, and operates a predetermined button on the control panel, with the robot arm held at this position, to teach the first robot the origin O1. In response to this teaching operation, the first robot control unit 30 reads out joint angle data of the individual axes of the first robot body 10 from the respective current value registers when the distal end of the arm 12 is positioned at the origin O1, and then stores the data in a memory. Thereafter, points A1 and B1 on X1 and Y1 axes, respectively, of the common coordinate system corresponding to second and third marks on the first jig 61 are sequentially taught to the first robot in a similar manner, and joint angle data related to the points A1 and B1 is stored in the memory.

The first robot control unit 30 recognizes the relationship between the first robot coordinate system set with respect to the first robot and the common coordinate system X1Y1Z1, based on the joint angle data representing the three points O1, A1 and B1, and then calculates a first coordinate transformation matrix for a transformation between the first robot coordinate system and the common coordinate system. Namely, the common coordinate system X1Y1Z1 is set with respect to the first robot.

Subsequently, the operator manually operates the first robot body 10 to position the distal end of the first robot arm 12 successively at first to third marks on the second jig 62, and sequentially teaches the first robot the origin O2 and points A2 and B2 on X2 and Y2 axes of a provisional coordinate system X2Y2Z2 corresponding to the first to third marks, respectively. In response to the teaching operations, the first robot control unit 30 stores joint angle data related to the points O2, A2 and B2 in the memory, then calculates a second coordinate transformation matrix for a coordinate transformation between the first robot coordinate system, set with respect to the first robot and the provisional coordinate system X2Y2Z2, and the provisional coordinate system X2Y2Z2, based on the joint angle data, and stores the calculated transformation matrix in the memory. Further, based on the thus-calculated second transformation matrix and the previously calculated first transformation matrix, the robot control unit 30 calculates a third coordinate transformation matrix T1 for a transformation between the provisional coordinate system X2Y2Z2 and the common coordinate system X1Y1Z1, stores data representing the coordinate transformation matrix T1 in the memory and at the same time supplies the data to the second robot control unit 40. This data is stored in a memory of the second robot control unit 40.

The operator then manually operates the second robot body 20 and positions the distal end of the second robot arm 22 successively at the first to third marks on the second jig 62, to thereby sequentially teach the second robot the origin O2, and the points A2 and B2 on the X2 and Y2 axes, respectively, of the provisional coordinate system X2Y2Z2 corresponding to the first to third marks. The second robot control unit 40 stores joint angle data related to the points O2, A2 and B2 in the memory, and based on the joint angle data, calculates a fourth coordinate transformation matrix for a transformation between the second robot coordinate system, set with respect to the second robot and the provisional coordinate system X2Y2Z2, and the provisional coordinate system X2Y2Z2. Further, based on the fourth transformation matrix thus calculated and the third transformation matrix T1 for the transformation between the provisional coordinate system X2Y2Z2 and the common coordinate system X1Y1Z1, read from the memory, the robot control unit 40 calculates a fifth coordinate transformation matrix for a transformation between the second robot coordinate system and the common coordinate system X1Y1Z1, and stores the calculated fifth matrix in the memory. Consequently, the common coordinate system X1Y1Z1 is set with respect to the second robot which is inaccessible to the first jig 61, without using a special jig accessible by both the first and second robots or changing the positions of the robots.

Figure 2:
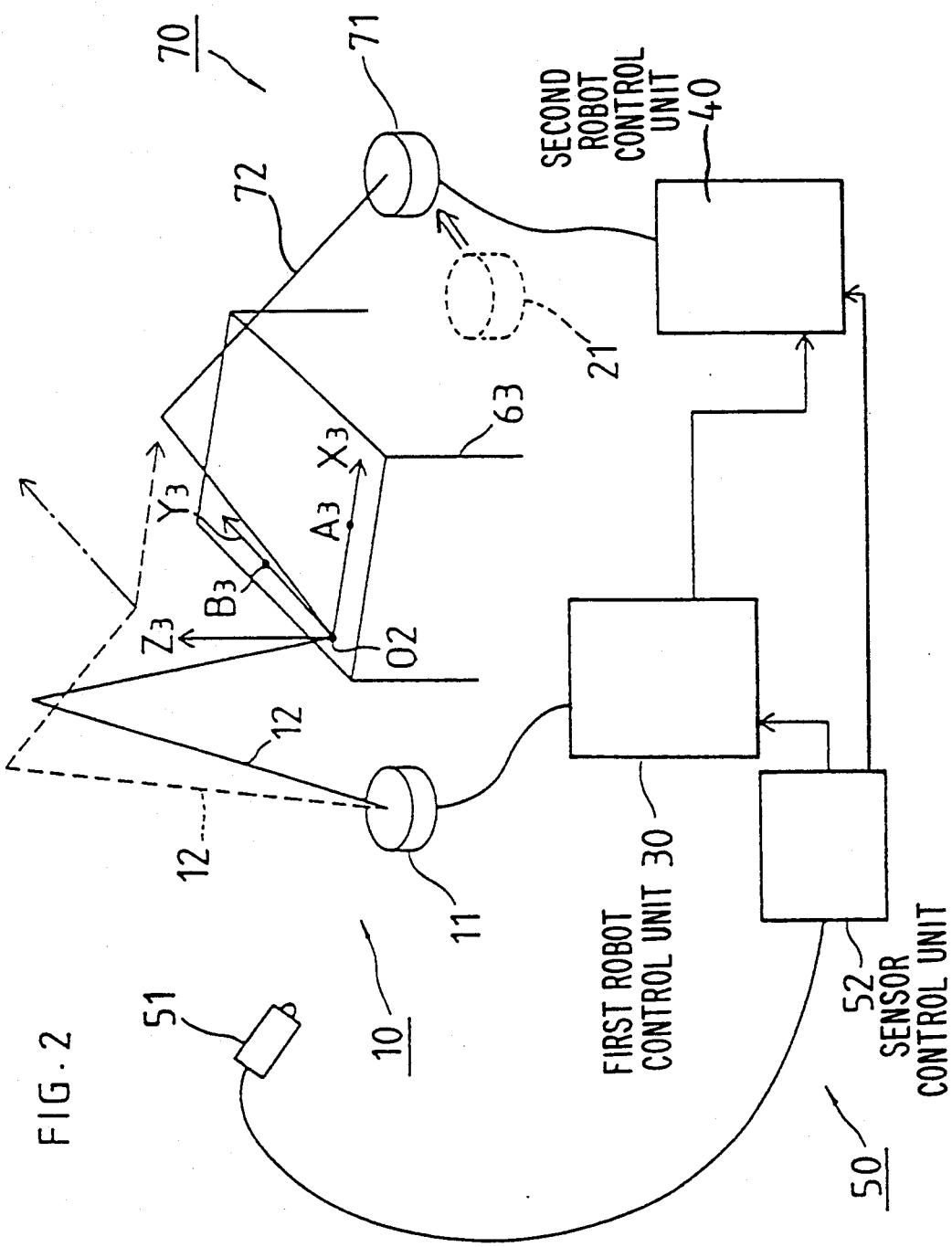
FIG. 2 is a schematic diagram illustrating the principle of setting a common coordinate system with respect to a substitute robot installed in the robot system.

After the common coordinate system is set with respect to the first and second robots, a robot operation is carried out. During the course of longterm operation, a robot may develop trouble, and in this case, a substitute robot is installed and the common coordinate system X1Y1Z1 is set with respect thereto. For example, if the second robot body 20 develops trouble and, as shown in FIG. 2, a third robot body 70 is arranged at a position coinciding or not coinciding with the position at which the second robot body has been installed, the common coordinate system X1Y1Z1 must be set with respect to the third robot. The third robot comprises the third robot body 70 and the second robot control unit 40, as in the case of the first and second robot bodies 10 and 20. Reference numerals 71 and 72 represent a swivel support and an arm, respectively.

When setting the common coordinate system X1Y1Z1 with respect to the third robot, the operator places a third jig 63, which may be the same as or different from the second jig 62, at a third position accessible by both the first and third robot bodies 10 and 70. The third position may or may not be coincident with the position (second position) at which the second jig 62 was placed during the previous setting of the common coordinate system. Subsequently, the operator manually operates the first robot body 10, and positions the distal end of the first robot arm 12 successively at first to third marks on the third jig 63 respectively corresponding to the origin O3, and points A3 and B3 on X and Y axes of a second provisional coordinate system X3Y3Z3, which may be identical with or different from the provisional coordinate system X2Y2Z2, to thereby sequentially teach the first robot the three points O3, A3 and B3 with the robot arm positioned at these points. In response to the teaching operations, the first robot control unit 30 detects joint angle data related respectively to the three points O3, A3 and B3 and stores the detected data in the memory.

The first robot control unit 30 then calculates a sixth coordinate transformation matrix for a transformation between the first robot coordinate system, set with respect to the first robot and the provisional coordinate system X3Y3Z3, and the second provisional coordinate system X3Y3Z3, on the basis of the joint angle data related to the three points O3, A3 and B3. Subsequently, based on the sixth thus-calculated transformation matrix and the first transformation matrix for the transformation between the first robot coordinate system and the common coordinate system X1Y1Z1, calculated during the previous setting of the common coordinate system, the first robot control unit 30 calculates a seventh coordinate transformation matrix T2 for a transformation between the second provisional coordinate system X3Y3Z3 and the common coordinate system X1Y1Z1, and supplies the data representing the transformation matrix T2 to the second robot control unit 40.

The operator then positions the distal end of the third robot arm 72 successively at the marks on the third jig 63 corresponding to the three points O3, A3 and B3 of the second provisional coordinate system X3Y3Z3, and teaches the third robot the three points O3, A3 and B3 sequentially with the robot arm positioned at the respective points. In response to the teaching operations, the second robot control unit 40 successively obtains joint angle data related to the three points O3, A3, and B3, and computes an eighth transformation matrix for a coordinate transformation between a third coordinate system peculiar to the third robot and the second provisional coordinate system X3Y3Z3. Further, based on this eighth transformation matrix and the seventh transformation matrix T2 for the transformation between the second provisional coordinate system X3Y3Z3 and the common coordinate system X1Y1Z1, a ninth transformation matrix for a coordinate transformation between the third robot coordinate system and the common coordinate system X1Y1Z1 is calculated and stored in the memory. As a result, the common coordinate system X1Y1Z1 is set with respect to the third robot. Unlike the conventional method in which, when a substitute robot is installed, the common coordinate system must be set again with respect to all robots by using a jig for setting the common coordinate system, the common coordinate system X1Y1Z1 can be easily set with respect to the substitute robot, and therefore, a factory line or the like can be readily restored after a substitute robot is installed because of robot trouble.

This invention is not limited to the above-described embodiment, and various modifications can be made. For example, although the embodiment is described with reference to a robot system including two multijoint robots, the invention can be applied to a robot system including three or more robots of various types. Furthermore, in the foregoing embodiment, the common coordinate system X1Y1Z1, the provisional coordinate system X2Y2Z2 and the second provisional coordinate system X3Y3Z3 are set on the first to third jigs 61 to 63, respectively, but they may be set in various ways insofar as the coordinate positions of the jigs with reference to the coordinate systems are known or measurable.

We claim:

1. A method of setting a robot coordinate system, comprising the steps of:

(a) placing a first jig at a first position directly accessible by a first robot;
   (b) setting a first robot common coordinate system by accessing said first jig using said first robot;
   (c) placing a second jig at a second position directly accessible by both said first robot and a second robot which cannot directly access said first jig;
   (d) setting a first robot first provisional coordinate system by directly accessing said second jig using said first robot;
   (e) calculating, using a computing device, a first coordinate transformation matrix for transforming said first robot first provisional coordinate system into said first robot common coordinate system;
   (f) setting a second robot first provisional coordinate system by directly accessing said second jig using said second robot;
   (g) calculating, using said computing device, a second robot common coordinate system based on said second robot first provisional coordinate system and said first coordinate transformation matrix; and
   (h) setting said second robot common coordinate system with respect to said second robot.

2. The method according to claim 1, further comprising the steps of:

(i) replacing said second robot with a third robot;
   (j) placing a third jig at a third position directly accessible by both said first and third robots;
   (k) setting a first robot second provisional coordinate system by directly accessing said third jig using said first robot;
   (l) calculating, using said computing device, a second coordinate transformation matrix for transforming said first robot second provisional coordinate system into said first robot common coordinate system;
   (m) setting a third robot second provisional coordinate system by directly accessing said third jig using said third robot;
   (n) calculating, using said computing device, a third robot common coordinate system based on said third robot second provisional coordinate system and said second coordinate transformation matrix; and
   (o) setting said third robot common coordinate system with respect to said third robot.

* * * * *

UNITED STATES PATENT AND TRADEMARK OFFICE
CERTIFICATE OF CORRECTION

PATENT NO. : 5,333,242
DATED : July 26, 1994
INVENTOR(S) : Atsushi Watanabe et al.

It is certified that error appears in the above-indentified patent and that said Letters Patent is hereby corrected as shown below:

Col. 1, line 49, after "robots" insert a --,--; and line 50, delete "thus".

Col. 4, line 17, "constitutes" should be --included in--; and line 20, "constitutes" should be --is included in--

Signed and Sealed this

Twentieth Day of December, 1994

Attest:

BRUCE LEHMAN

Attesting Officer    Commissioner of Patents and Trademarks